July 28, 1959 C. W. HEATH 2,897,474

ELECTRICAL COMPONENT AND ATTACHING MEANS THEREFOR

Filed Dec. 8, 1954

INVENTOR
CLARENCE WILLANS HEATH
BY John Todd
ATTORNEY

United States Patent Office 2,897,474 Patented July 28, 1959

2,897,474

ELECTRICAL COMPONENT AND ATTACHING MEANS THEREFOR

Clarence Willans Heath, Bleasby, England, assignor, by mesne assignments, to United-Carr Fastener Corporation, Boston, Mass., a corporation of Delaware Application December 8, 1954, Serial No. 473,930

3 Claims. (Cl. 339—128)

This invention relates to improvements in and relating to electrical components for example holders for thermionic valves, electrical plugs or like electrical devices having projecting contact members and to an improved method of mounting said components on an apertured panel or like support.

The components according to the present invention are particularly adapted for assembly on panels of insulating material having electrical circuit diagrams printed, etched or otherwise marked thereon. The electrical components for use with such "printed" circuits may be adapted to be connected to adjacent parts of the diagram by the solder dip process, and the present invention aims to provide means whereby the components may be readily assembled and retained in position before this soldering operation is to be effected.

According to the present invention an electrical component having a body of insulating material is mounted on an apertured support by mounting means comprising a metal member including a shank like portion adapted to extend into a bore in said body, and provided with a portion projecting from an end thereof, said end being provided with means for engaging the support to secure the component thereto.

The invention also includes a combination of an electrical component comprising a body insulating material having an axial bore, and a panel of insulating material having an electrical circuit diagram printed, etched or otherwise marked on one face, the said body having a series of electrical contacts mounted therein and provided with wiring terminals projecting from one end of the body through apertures in the panel located adjacent to parts of the printed circuit, said component being secured in assembly with the panel by a mounting member comprising a hollow metal tube having a shank portion extending into the bore of the body and having means adjacent to one end for engagement with the panel, said wiring terminals and mounting member being electrically connected with parts of said printed circuit.

To enable the invention to be fully understood it will now be described with reference to the accompanying drawing, in which.

Figure 1:
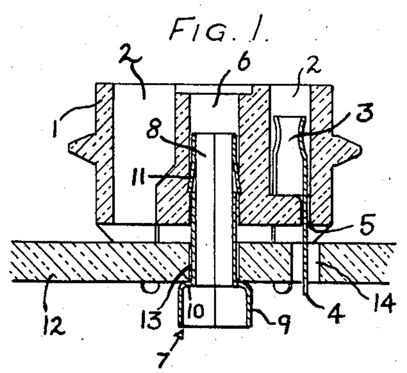
Fig. 1 is a sectional side view of a thermionic valve holder mounted on a supporting panel according to one embodiment of the invention.
Figure 2:
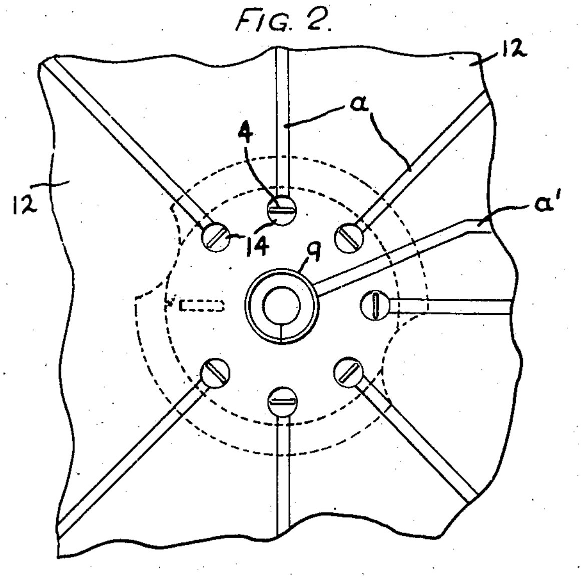
Fig. 2 is a bottom plan view of the panel and assembled holder shown in Fig. 1.

As shown in Figs. 1 and 2 the thermionic valve holder comprises a body 1 moulded from insulating material having a series of contact receiving recesses 2 in which valve prong engaging contacts 3 are located, each contact having a tail piece or wiring terminal 4 extending through a slot 5 in the underface of the body. The body 1 is also formed with a central axially extending bore 6 adapted to receive the mounting member generally indicated by 7.

The mounting member comprises a hollow tubular shank or sleeve portion 8 having an outer end 9 of enlarged diameter providing shoulders 10 at the juncture of the shank and enlarged portion. Adjacent to its inner end portions of the wall of the shank are cut and bent to form oppositely disposed tongues 11 having their free ends directed towards the shoulders 10.

Figure 3:
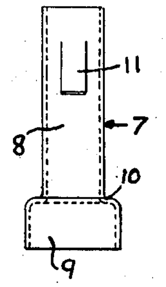
Fig. 3 is a side view on an enlarged scale of the mounting member illustrated in Fig. 1.
Figure 4:
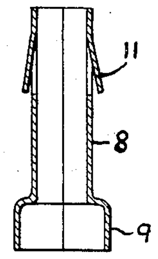
Fig. 4 is a sectional side view of the mounting member but taken at right angles to the view shown in Fig. 3.

The holder is adapted to be mounted on a panel 12 having an electrical circuit diagram comprising conducting areas $a$, $a^1$ printed, etched or otherwise marked on at least one face. The holder is adapted to be positioned on the panel with the bore 6 in alignment with the aperture 13 and the tail pieces 4 in alignment with and extending through apertures 14. The shank portion 8 of the mounting member is then inserted through the aperture 13 from the under side of the panel and entered into the bore 6 until the shoulder 10 abuts the underface of the panel. The tongues 11 are adapted to flex to permit the shank to be inserted and will make frictional engagement with the wall of the bore and serve to secure the holder in assembly. It will be understood that the panel will normally have a number of valve holders and other components mounted thereon, all of which may be secured by a mounting member such as illustrated in Figs. 1 and 3. It will be noted that the shoulder 10 of the mounting member and the tail pieces 4 are positioned adjacent to parts of the electrical diagram to which they are to be connected.

The assembly is then solder dipped to effect soldered connections between the tail pieces 4 and the appropriate parts $a$ of the printed circuit and between the mounting member and the circuit part $a^1$. The mounting member may constitute a grounding shield and in this case the part $a^1$ of the circuit will be grounded.

If desired the inner wall of the bore 6 may be formed with shoulders for engagement with the free ends of the tongues 11.

Figure 6:
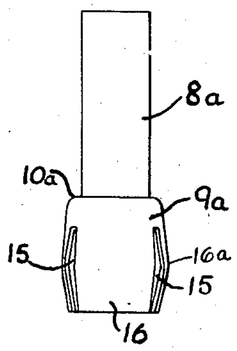
Fig. 6 is a side view on an enlarged scale, of the modified mounting member illustrated in Fig. 5.
Figure 5:
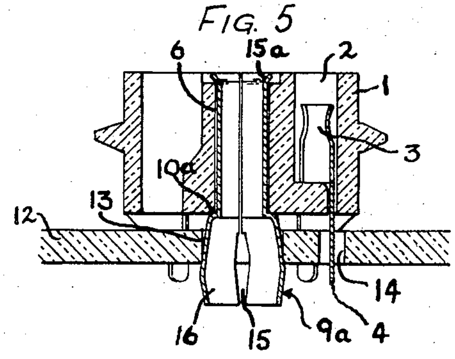
Fig. 5 is a sectional side view of a valve holder mounted on the supporting panel according to a modified form of the invention.
Figure 7:
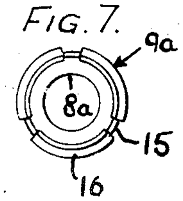
Fig. 7 is a bottom plan view of the mounting member.

According to the modification illustrated in Figs. 5 to 7 a mounting member comprises a hollow tubular shank 8*a* having a portion 9*a* of enlarged diameter at its outer end. As shown this latter portion is formed with a series of axial slots 15 to form a series of resilient arms 16 which are bowed outwardly. The shank 8*a* is adapted to be permanently secured in the axial bore 6 by spreading the end of the shank outwardly to form an annular flange 15*a* extending over a portion of the body 1 adjacent to the bore 6 to co-operate with the shoulder 10*a* which engages the opposite face of the body 1 so as to secure the mounting member in assembly with the holder.

The holder is assembled on the panel 12 by aligning the portion 9*a* with the aperture 13 and the tail pieces 4 with the apertures 14. The holder is then pressed axially towards the panel to force the portion 9*a* through the aperture 13 until the enlarged diameter of the arms 16, indicated in Fig. 6 by 16*a*, will be positioned against the underface of the panel 12. By virtue of their resilience the arms will then make frictional engagement with the edge of the wall of the aperture 13 to hold the holder in assembly with the panel. As in the previous embodiment the assembly is then solder dipped to effect soldered connections between the tail piece 4 and the portion 9*a* of the mounting member with the appropriate parts of the printed circuit diagram on the panel.

The mounting members according to both embodiments of the invention are formed from sheet metal which is bent into tubular form, the enlarged end portions 9, 9*a* being formed by any suitable means.

Although the invention is particularly adapted for mounting thermionic valve holders on a panel it is not necessarily limited in this respect, but may be adapted for securing other electrical components to a panel or other support.

It will be seen that the present invention provides a convenient means of assembling valve holders or other components on a supporting panel and retaining them in correct position while the assembly is solder dipped.

In effecting the solder dip operation the underface of the panel is dipped into a bath of solder whereby some of the solder is caused to flow by capillary action into the apertures 14 to make soldered connections with the parts of the terminals 4 positioned therein. The size of the apertures 14 are shown exaggerated in the accompanying drawing but it will be understood that they will be of such diameter and depth as to permit the solder to flow upwardly into the apertures by capillary action.

I claim:

1. An electrical component comprising a body of insulating material having upper and lower surfaces, said insulating material having a central, axially extending opening therein and a plurality of openings circularly disposed around said central opening, said plurality of openings each having a metal contact member carried by said body, said contact members having a terminal element extending through said openings in the lower surface of said body and disposed outwardly therefrom, a mounting contact member disposed in said central opening and having resilient enlarged shoulder means immediately adjacent one end thereof, and disposed outwardly of the lower surface of said body, the greatest diameter of said shoulder means being larger than the diameter of said central opening and gradually decreasing toward said lower surface of said body, said shoulder means permitting engagement with a supporting panel through an aperture formed therein in alignment with the central opening in said insulating body, the opposite free end of said mounting contact member being disposed below the upper surface of said insulating body.

2. An electrical component in accordance with claim 1, in which said shoulder means includes at least two outwardly bowed resilient arms.

3. An electrical component in accordance with claim 1, in which said mounting contact member includes a shank member secured in the central, axially extending opening.

References Cited in the file of this patent

UNITED STATES PATENTS

| | | |
|---|---|---|
| 2,519,121 | Del Camp | Aug. 15, 1950 |
| 2,613,244 | Del Camp | Oct. 7, 1952 |
| 2,626,978 | Coyle | Jan. 27, 1953 |
| 2,637,763 | Palmer | May 5, 1953 |
| 2,708,266 | Pavlinetz | May 10, 1955 |
| 2,802,995 | Mautone et al. | Aug. 13, 1957 |

FOREIGN PATENTS

| | | |
|---|---|---|
| 367,676 | Great Britain | Feb. 25, 1932 |
| 641,800 | Great Britain | Aug. 23, 1950 |
| 711,016 | Great Britain | June 23, 1954 |